Sept. 6, 1932.  W. HILGERS  1,875,811
MACHINE FOR ILLUMINATING, SORTING, AND STAMPING EGGS
Filed July 16, 1930  3 Sheets-Sheet 1
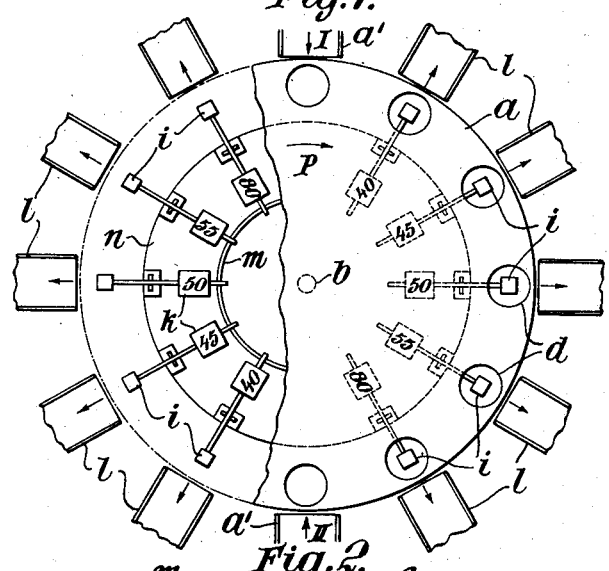
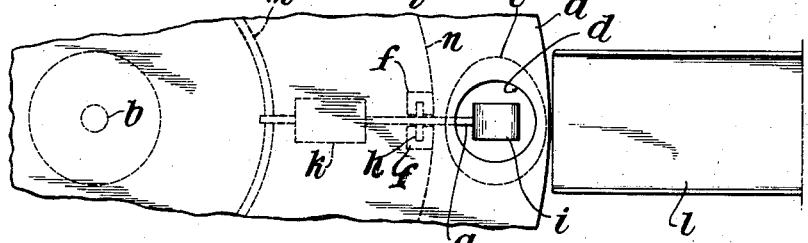
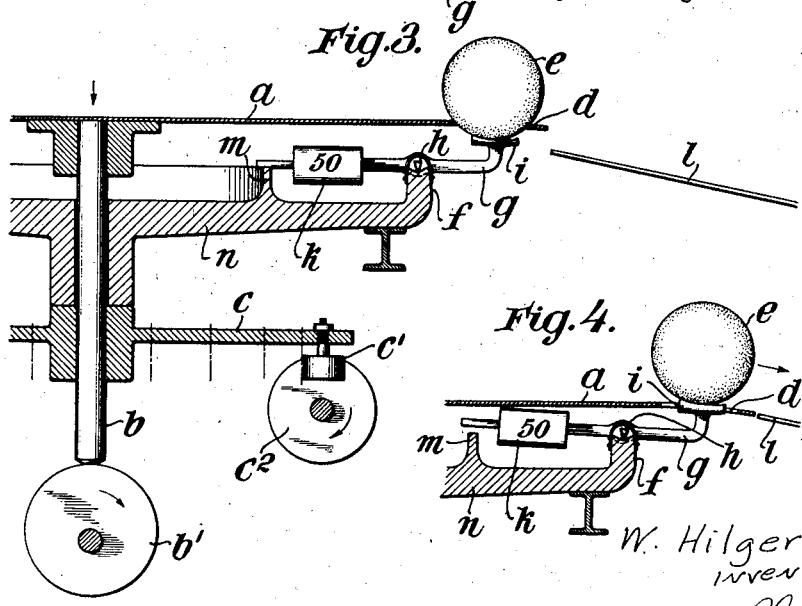
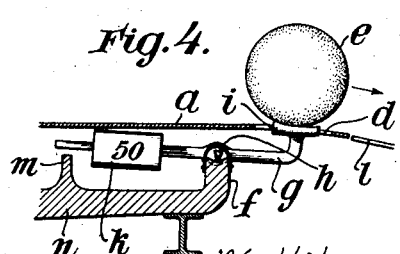
W. Hilgers
INVENTOR
By: Marks Klein
ATTYS.

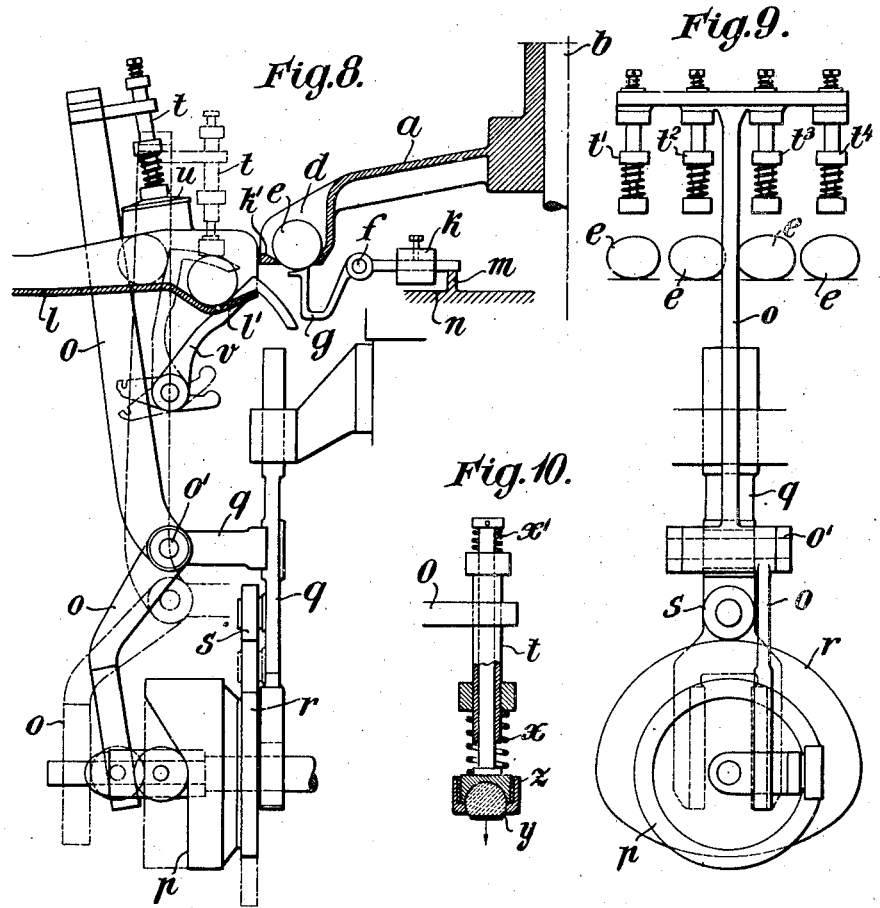
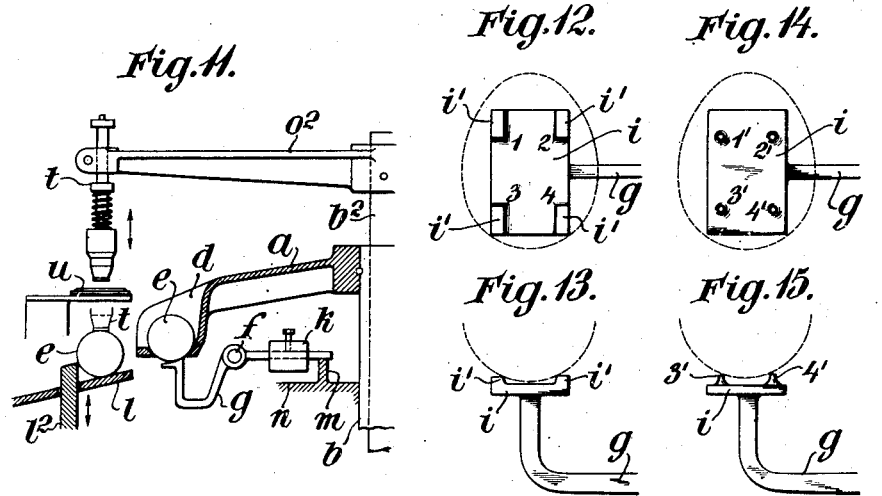

Patented Sept. 6, 1932

1,875,811

UNITED STATES PATENT OFFICE

WILHELM HILGERS, OF DUSSELDORF, GERMANY

MACHINE FOR ILLUMINATING, SORTING, AND STAMPING EGGS

Application filed July 16, 1930, Serial No. 468,438, and in Germany August 24, 1929.

This invention relates to a machine for illuminating, sorting and stamping eggs, which, in a continuous working operation, permits firstly of the separation of useless eggs, and then of the automatic sorting of the good eggs according to their weight, and the printing of indications of weight thereon, so that the eggs are classified into different groups by weight in the most rational manner, for the purpose of being packed for sale or dispatch.

According to the invention the machine works in such a manner that the eggs to be sorted are first passed over one or more admission channels, the bottoms of which are provided with illumnating devices for the eggs admitted, to an intermittently moving sorting table, which enables the eggs to be sorted into different groups according to weight, and then, during a short stoppage upon discharge channels, provided with their weight marks, after which they are discharged.

In this machine it is of particular importance that the eggs are not pushed to the scale, as in the case of known devices for the sorting of eggs, but are carried by a rotary table, which moves up and down and is fed forward intermittently, and are lowered by this rotary table on to the scales which either discharge the eggs or else remain unaffected, in which latter case the eggs are lifted again by the rotary table and carried to another balance.

In the case of eggs being pushed forward by known methods, the eggs roll sometimes upon their circular cross sections and sometimes upon their oval cross sections, they stand up and are pushed over, many of them break in two. Moreover the scales are laterally stressed and are liable to stick, and the eggs owing to their reeling or staggering motion, require some time to come to rest upon the scale, and all of these circumstances diminish the capacity of the machine, and are also liable to contaminate it.

This and other disadvantages are obviated in the machine according to the present invention, so that the latter works more quickly and more accurately.

Figure 5:
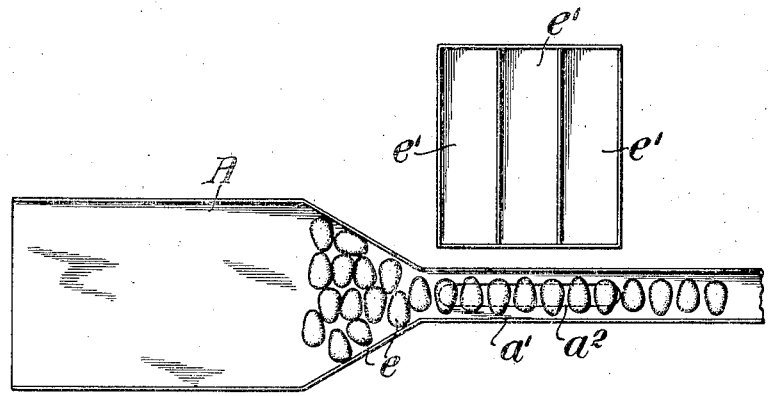
Figure 6:
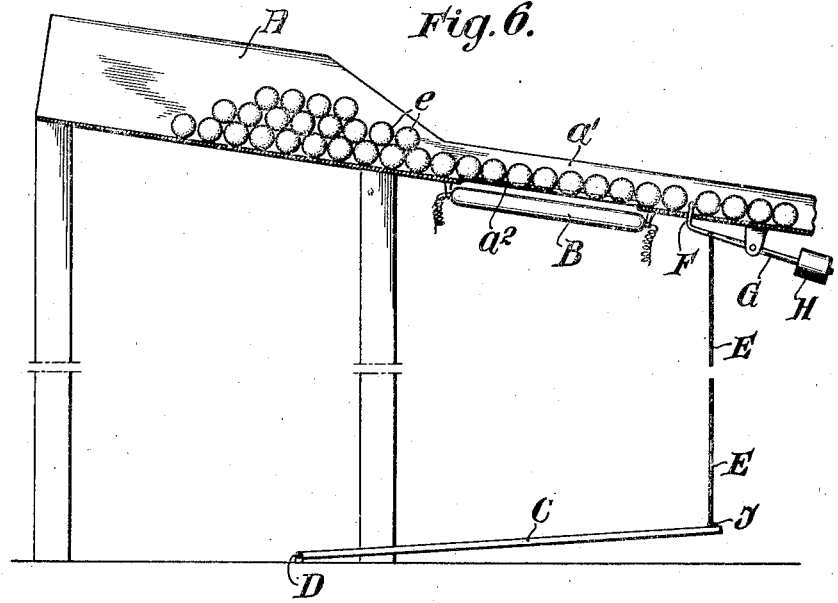

Various constructional forms of the invention are illustrated by way of example in the accompanying drawings, in which, in order to enable the invention to be more readily understood, the part of the machine serving for the sorting is described first, then the part serving for illuminating the eggs, and finally the part serving for stamping them. In these drawings, Fig. 1 is a plan of the sorting device;
Fig. 2 shows a part of Fig. 1 on a somewhat larger scale;
Fig. 3 is a side view, partly in section, of the part shown in Fig. 2;
Fig. 4 shows part of Fig. 3, with certain parts of the apparatus in a different position;
Fig. 5 is a plan of the device for illuminating the eggs by transmitted light;
Fig. 6 is a longitudinal section thereof, and
Fig. 7 a cross section through the discharge channel;
Fig. 8 is a side elevation, partly in section, of the stamping device;
Fig. 9 a front elevation thereof;
Fig. 10 a detail in side elevation, partly in section;
Fig. 11 shows diagrammatically a modified constructional form of the stamping device in side elevation, partly in section;
Figs. 12 and 13 and Figs. 14 and 15 show in plan and elevation two different constructional forms of scale pans for weighing the eggs.

A rotary table $a$, carried by a spindle $b$, receives intermittent feeding movements by means of suitable driving gear, for instance by means of a disc $c$, which carries on its periphery rollers $c'$, which engage in the threads of an intermittently driven worm $c^2$. At the same time there is imparted to the rotary table, by means of an eccentric $b'$ acting against its spindle $b$, at every feeding movement of the table $a$, and up-and-down movement. $d$, $d$ are apertures in the table top $a$, which serve for the reception of eggs $e$, supplied by way of two channels $a'$, the eggs being illuminated by transmitted light in a manner to be hereinafter described.

Supports mounted upon a stationary carrying body $n$ serve for the reception of lever balances $g$, which are oscillatably mounted by means of knife edges or pivots $h$ and are arranged in radial directions at uniform distances round the rotary table $a$. The balances carry at the ends remote from the rotary table scale pans $i$, and at the inner ends of the levers sliding weights $k$, which are graduated into different weight groups, as shown by way of example in Fig. 1, in which the indications in grammes are marked on the weights. In the example illustrated, two groups of five balances each are provided, so that the capacity of the machine is doubled.

$l, l$ are discharge channels, down which the classified eggs roll. $m$ is an annular projection on the supporting body $n$, and serves, in the raised position of the table, shown in Fig. 3, as a support for the inner ends of all the balances $g$, while in the lower position of the table $a$, shown in Fig. 4, the balances are free to oscillate when an egg of sufficient weight takes up a position upon the scale pan $i$. If the egg in question is lighter than the weight on the balance, the latter remains at rest, and the egg, being without lateral support when the table descends, as shown in Fig. 4, rolls on to the discharge channel $l$, and this egg, after it has been provided in a manner to be hereinafter described, with its weight mark, rolls down the channel $l$ and is discharged. If the egg is heavy enough to rock the scale pan down, the egg is lifted off the balance by the table when it ascends again and carried to the next balance, this operation being repeated until the egg is discharged by a corresponding balance.

The apertures $d$ are distributed at uniform distances throughout the periphery of the rotary table, these distances corresponding accurately to the distances between the centres of the scale pans $i$. One balance is supplied for each weight group, or else two or more balances for each group. If for example the eggs are to be sorted in the following groups:—

(1) Up to 40 grammes
(2) 40 to 45 grammes
(3) 45 to 50 grammes
(4) 50 to 55 grammes
(5) Over 55 grammes, the groups of balances are to be adjusted to 40, 45, 50 and 55 grammes and to the maximum weight of an egg, which may be about 80 grammes.

The requisite four, five or six groups of balances may be arranged one or more times round the periphery of the rotary disc according to its size, whereby the capacity of the apparatus is correspondingly increased.

Before the eggs are supplied to the table $a$ the bad eggs must be separated out, this being rendered possible in a very simple and reliable manner by means of the aforementioned illuminating device.

Figure 7:

In Figs. 5, 6, and 7, A is a box-shaped receptacle for eggs, which is provided with a narrow discharge channel $a'$, $a^2$ is a longitudinal slot in the bottom of the channel $a'$, beneath which a source of light B is provided, which extends throughout the length of the slot $a^2$. Beside the channel $a'$ are erected open receptacles $e'$. A pedal or foot lever C is pivoted at D and is connected at J with a pull-rod E, the other end of which is secured to a two-armed lever G, which carries at one end a counterbalancing weight H and at the other end a tongue F, which can engage through an aperture in the bottom of the discharge passage $a'$.

Since the box A and the discharge channel $a'$ are inclined, the eggs in the box A tend to roll down the discharge channel $a'$, the discharge of the eggs being so regulated by an operator standing near the apparatus that the eggs roll down uniformly, and in so doing pass over the longitudinal slot $a^2$ and therefore the source of light B, so that the bad eggs can be recognized and can be removed by hand and put into the boxes $e'$. The admission of eggs to the sorting device can be checked or released at will by depressing or releasing the foot lever C, and thereby retracting or inserting the tongue F in the discharge channel $a'$.

The channels $a'$ guide the eggs as already mentioned to the sorting device hereinbefore described, after leaving which they are provided with their weight marks. The device that effects the stamping of the eggs is shown in Figs. 8 to 11, in the two constructional examples already mentioned. The rotary table $a$, fed forward by means of the spindle $b$, in the manner hereinbefore described, with simultaneous raisings and lowerings from balance to balance, is here somewhat modified, which however does not affect the essence of the invention.

If an egg lying in one of the troughs $d$ of the table $a$ is lighter than the adjusted weight of the corresponding balance over which it is located when the table comes to a stand-still, the said balance raises the egg above the margin $k'$ of the descending rotary table, so that it comes to lie in a trough or recess $l'$ of the discharge channel $l$. If the egg in question is heavier than the weight of the balance it is carried by the rotary table to the next balance, and so on until it reaches one that corresponds to the weight of the egg. This balance now lifts the egg over the margin $k'$ of the rotary table into the adjacent channel $l$.

$u$ is a stamp pad firmly attached to the side of the channels $l$, while a double-armed lever $o$ is pivoted at a point $o'$. By a cam $p$ there is imparted to the lever a reciprocating movement which causes it to oscillate about the point $o'$. Since the fulcrum $o'$ is mounted on a slide piece $q$, an up-and-down movement is imparted to it, and therefore to the lever $o$, by means of a cam disc $r$ and a roller $s$ secured to the slide piece, so that owing to these movements the double-armed lever $o$ is moved from the position shown in full lines into the position shown in dot-and-dash lines, whereby four stamp-holders $t^1$, $t^2$, $t^3$, and $t^4$, secured thereto as shown in Fig. 9, oscillate with it. The stamps secured to the stamp-holders are therefore moved from their position on the stamp pad, from which they take up ink, into the position, likewise shown in dot-and-dash lines, in which they bear upon the eggs and thereby stamp them.

Now since, owing to the sorting apparatus described, a particular weight group of eggs run underneath each stamp, each egg lying in the trough $l'$ can be stamped with the mark of its weight group.

After the eggs have been stamped in this way the stamp goes back to the stamp pad, while at the same time a lever $v$ is brought by a cam, not shown, into the position shown in dot-and-dash lines, in which it conveys the egg out of the trough $l'$ into the channel $l$, which, being inclined, automatically causes the eggs to roll away.

The stamp-holders $t$ are resiliently displaceable in the longitudinal direction, according to Fig. 10 for instance by means of spiral springs $x$ and $x'$. It would also be possible to employ plate springs, air cushions, sponge rubber or the like. The object of the resilient arrangement of the stamps is to enable both thin and thick eggs to be reached by the same stamp and to be resiliently printed without damaging them.

In order that the stamp $y$ may bear correctly, independently of the various positions in which an egg may lie, the said stamp is supported by a ball joint in the fastening piece $z$, as shown in Fig. 10.

If more than two of the stamping devices described are arranged round the rotary table, with a corresponding number of groups of stamps, a similar number of supply channels must also be provided, so that in a given interval of time the apparatus sorts and stamps more eggs than hitherto.

In the second constructional form of the stamping device, which is illustrated in Fig. 11, the shaft $b$ that receives the rotary table $a$ is constructed as a hollow shaft, in which is journalled a second shaft $b^2$, which is movable independently of the hollow shaft $b$. This shaft $b^2$ carries, above the rotary table $a$, a carrier $o^2$, which is constructed as a set of individual arms corresponding to the number of discharge channels $l$, each arm carrying a resilient weight stamp $t$, and each weight stamp, in its position of rest, hanging close above a stamp pad $u$.

If the egg $e$ lying in the trough $d$ of the descending table $a$ is lighter than the weight $k$ of the balance $g$, it is transferred by the latter to the channel $l$. Here for a short interval of time it is prevented from rolling down by one of the slide-like projections $l^2$ arranged round the table to correspond to the number of discharge channels and projecting through the various channels $l$. During this interval the shaft $b^2$ executes a descending movement, controlled by cams or the like, not shown, as a result of which all the stamps $t$ are moved down on to their stamp pads $u$, and from there are moved sideways and lowered on to the stationary eggs $e$, so that all the eggs $e$, which are kept stationary upon the channels $l$ by means of the slides $l^2$, are provided with their appropriate weight marks. The shaft $b^2$ then executes its return movement, with all the stamps $t$, while at the same time the slide-like projections $l^2$ are moved so far down that the eggs can roll away over the latter, whereupon the slides ascend again, and therefore the next sorted eggs are stopped.

The scale pans $i$ shown in Figs. 12 to 15 present a reliable support for the egg upon the scale pan, as a result of which the stamping of the eggs, which takes place after each advancing movement of the rotary table, can be effected more easily and more reliably, since the rocking of the eggs upon the scale pans is prevented. This is attained by constructing the scale pans of the individual lever balances in such a way that the egg is supported at least at three points, and preferably at four points.

According to Figs. 12 and 13, each of the levers $g$ terminates in a plate $i$, the four corners of which are constructed as rectangular projections $i'$ in such a way that the adjacent or inner edges 1, 2, 3 and 4 of these projections form the supporting points for the egg.

The construction according to Figs. 14 and 15 is distinguished from the one just described by the fact that four nipple-like projections $1'$, $2'$, $3'$ and $4'$ are similarly distributed and form the support for the egg.

What I claim is:—

1. In a machine for illuminating, sorting and stamping eggs, a rotatable sorting table adapted to classify eggs into different weight groups, a plurality of discharge channels each adapted to receive from the sorting table eggs of a particular weight, each discharge channel being formed with a recess in which each egg that passes along the channel comes to rest for a short time, a plurality of weight stamps bearing different designations for the different groups of eggs, stamp pads for inking the weight stamps, means comprising cam discs for moving the weight stamps from the stamp pads to the eggs and back, so as to stamp each egg with an indication of its weight during its stoppage in the recess, and mechanically controlled means for shifting each egg out of the recess after it has been stamped.

2. In a machine for illuminating, sorting and stamping eggs, a rotatable sorting table adapted to classify eggs into different weight groups, a plurality of discharge channels each adapted to receive from the sorting table eggs of a particular weight, each discharge channel being formed with a recess in which each egg that passes along the channel comes to rest for a short time, a hollow spindle supporting the sorting table, a shaft journalled in the hollow spindle, a plurality of weight stamps bearing different designations for the different groups of eggs, all of the said weight stamps being carried by the said shaft, stamp pads for inking the weight stamps, means comprising cam discs for raising, rotating and lowering the shaft so as to move the weight stamps from the stamp pads to the eggs and back and thereby to stamp each egg with an indication of its weight during its stoppage in the recess, and mechanically controlled means for shifting each egg out of the recess after it has been stamped.

3. In a machine for illuminating, sorting and stamping eggs, a rotatable sorting table adapted to classify into different weight groups, a plurality of discharge channels each adapted to receive from the sorting table eggs of a particular weight, each discharge channel being formed with an aperture therein, a movable member slidable into and out of the said aperture to check or release the eggs moving along the discharge channel, a plurality of weight stamps bearing different designations for the different groups of eggs, means for bringing the weight stamps into contact with the eggs checked by the movable members, and means for withdrawing the movable member to let the stamped egg pass and returning the movable member to stop the next egg.

In testimony whereof I affix my signature.

WILHELM HILGERS.